US010289291B2

(12) United States Patent
Shah et al.

(10) Patent No.: US 10,289,291 B2
(45) Date of Patent: May 14, 2019

(54) EDITING NESTED VIDEO SEQUENCES

(71) Applicant: ADOBE SYSTEMS INCORPORATED, San Jose, CA (US)

(72) Inventors: Abhishek Shah, Delhi (IN); Shailesh Kumar, Noida (IN); Subbiah Muthuswamy Pillai, Thane (IN)

(73) Assignee: Adobe Inc., San Jose, CA (US)

( * ) Notice: Subject to any disclaimer, the term of this patent is extended or adjusted under 35 U.S.C. 154(b) by 467 days.

(21) Appl. No.: 15/091,345

(22) Filed: Apr. 5, 2016

(65) Prior Publication Data

US 2017/0285918 A1  Oct. 5, 2017

(51) Int. Cl.
| | |
|---|---|
| *G06F 3/0484* | (2013.01) |
| *G11B 27/031* | (2006.01) |
| *G11B 27/34* | (2006.01) |
| *G06T 13/80* | (2011.01) |

(52) U.S. Cl.
CPC .......... *G06F 3/04845* (2013.01); *G06T 13/80* (2013.01); *G11B 27/031* (2013.01); *G11B 27/34* (2013.01)

(58) Field of Classification Search
CPC ... G06F 3/04845; G06T 13/80; G11B 27/031; G11B 27/34
See application file for complete search history.

(56) References Cited

U.S. PATENT DOCUMENTS

| | | | | |
|---|---|---|---|---|
| 5,982,350 | A * | 11/1999 | Hekmatpour | H04N 5/262 345/473 |
| 6,154,601 | A * | 11/2000 | Yaegashi | G11B 27/034 386/230 |
| 6,556,775 | B1 * | 4/2003 | Shimada | H04N 5/272 348/E5.058 |
| 6,621,524 | B1 * | 9/2003 | Iijima | H04N 5/262 348/584 |
| 6,744,968 | B1 * | 6/2004 | Imai | G11B 27/034 348/E5.051 |
| 6,798,424 | B2 * | 9/2004 | Nakamura | H04N 19/23 345/629 |
| 6,798,897 | B1 * | 9/2004 | Rosenberg | G06T 7/33 348/154 |
| 6,956,573 | B1 * | 10/2005 | Bergen | G06F 17/30802 345/473 |
| 7,034,833 | B2 * | 4/2006 | Epshteyn | G06T 13/80 345/473 |

(Continued)

*Primary Examiner* — Stella Higgs
(74) *Attorney, Agent, or Firm* — Shook Hardy & Bacon L.L.P.

(57) ABSTRACT

A method for editing nested video sequences includes receiving a selection, by a user in a graphical user interface (GUI), of a video clip that corresponds to a nested video sequence of a parent video sequence. In response to the selection, each higher layer of the parent video sequence than a given layer that comprises the video clip is disabling from being rendered in a monitor view of the GUI. An image of the parent video sequence is rendered in the monitor view while each higher layer is disabled from being rendered. Also while each higher layer is disabled from being rendered, a manipulation by the user of a GUI element that corresponds to a graphical object from the nested video sequence is received. The manipulation is applied to the graphical object from the nested video sequence.

20 Claims, 11 Drawing Sheets

(56) References Cited

U.S. PATENT DOCUMENTS

| | | | | |
|---|---|---|---|---|
| 7,103,840 B2* | 9/2006 | Ihara | G06F 1/162 | 348/E5.025 |
| 7,181,081 B2* | 2/2007 | Sandrew | G06T 11/001 | 348/100 |
| 7,213,089 B2* | 5/2007 | Hatakenaka | G11B 27/034 | 348/239 |
| 7,265,762 B2* | 9/2007 | Purdy | G06T 11/206 | 345/629 |
| 7,388,587 B1* | 6/2008 | Richardson | G06T 13/80 | 345/474 |
| 7,609,271 B2* | 10/2009 | Lin | G06T 13/80 | 345/474 |
| 8,340,493 B2* | 12/2012 | Axen | G11B 27/031 | 386/232 |
| 8,359,537 B2* | 1/2013 | Lyons | G11B 27/034 | 715/720 |
| 8,508,534 B1* | 8/2013 | George | G06T 13/80 | 345/473 |
| 8,533,598 B2* | 9/2013 | Meaney | G11B 27/031 | 715/716 |
| 8,555,169 B2* | 10/2013 | Pendergast | G11B 27/034 | 715/716 |
| 8,555,170 B2* | 10/2013 | Rodriguez | G11B 27/34 | 345/473 |
| 8,881,013 B2* | 11/2014 | Lyons | G06F 3/048 | 715/229 |
| 9,032,020 B2* | 5/2015 | Gregg | H04N 21/222 | 709/203 |
| 9,208,819 B1* | 12/2015 | Gregg | G11B 27/034 | |
| 9,286,941 B2* | 3/2016 | Sandrew | G11B 27/031 | |
| 9,536,564 B2* | 1/2017 | Pendergast | G11B 27/034 | |
| 9,547,937 B2* | 1/2017 | Sandrew | G06T 19/00 | |
| 2003/0107604 A1* | 6/2003 | Ording | G06F 3/0481 | 715/788 |
| 2004/0001079 A1* | 1/2004 | Zhao | G11B 27/034 | 715/719 |
| 2004/0039934 A1* | 2/2004 | Land | G11B 27/034 | 726/26 |
| 2004/0056883 A1* | 3/2004 | Wierowski | G06F 3/0482 | 715/719 |
| 2006/0129933 A1* | 6/2006 | Land | G11B 27/034 | 715/723 |
| 2006/0263037 A1* | 11/2006 | Gilley | G06Q 30/02 | 386/232 |
| 2007/0101271 A1* | 5/2007 | Hua | G11B 27/034 | 715/731 |
| 2007/0162855 A1* | 7/2007 | Hawk | G11B 27/034 | 713/730 |
| 2008/0028312 A1* | 1/2008 | Alvarez | G11B 27/034 | 715/719 |
| 2008/0184139 A1* | 7/2008 | Stewart | G06F 9/451 | 715/762 |
| 2009/0085918 A1* | 4/2009 | Hollingworth | G06T 3/40 | 345/475 |
| 2009/0222870 A1* | 9/2009 | Gruber | G06Q 10/06 | 725/109 |
| 2013/0073963 A1* | 3/2013 | Pendergast | G11B 27/034 | 715/716 |
| 2013/0124980 A1* | 5/2013 | Hudson | G06F 17/21 | 715/243 |
| 2013/0124990 A1* | 5/2013 | Lettau | G11B 27/34 | 715/716 |
| 2013/0314749 A1* | 11/2013 | Boyd | G11B 27/031 | 358/1.18 |
| 2013/0318424 A1* | 11/2013 | Boyd | G11B 27/031 | 715/202 |
| 2014/0079278 A1* | 3/2014 | Shah | G11B 27/034 | 382/100 |
| 2014/0285624 A1* | 9/2014 | Acquavella | G06T 19/20 | 348/46 |

* cited by examiner

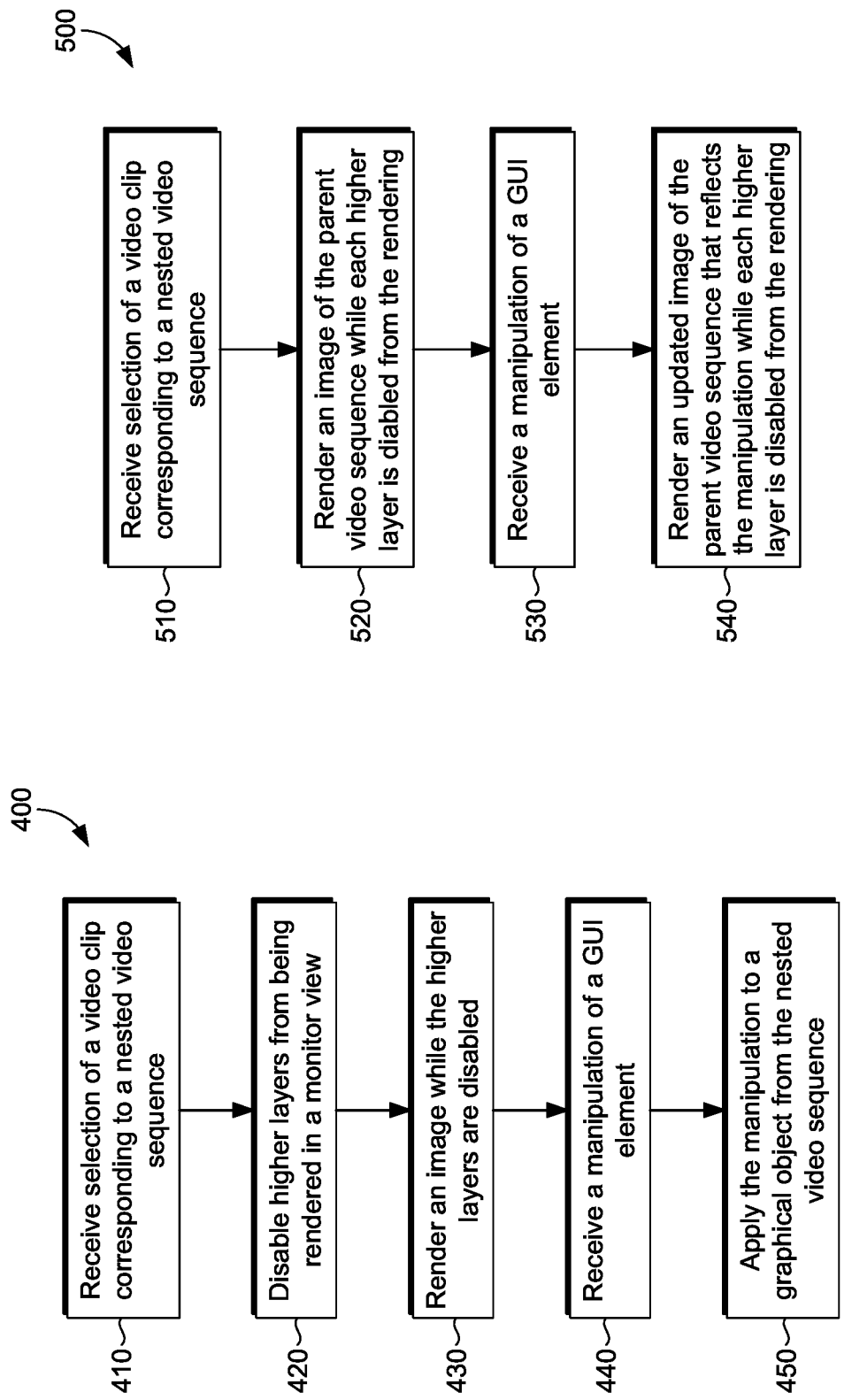

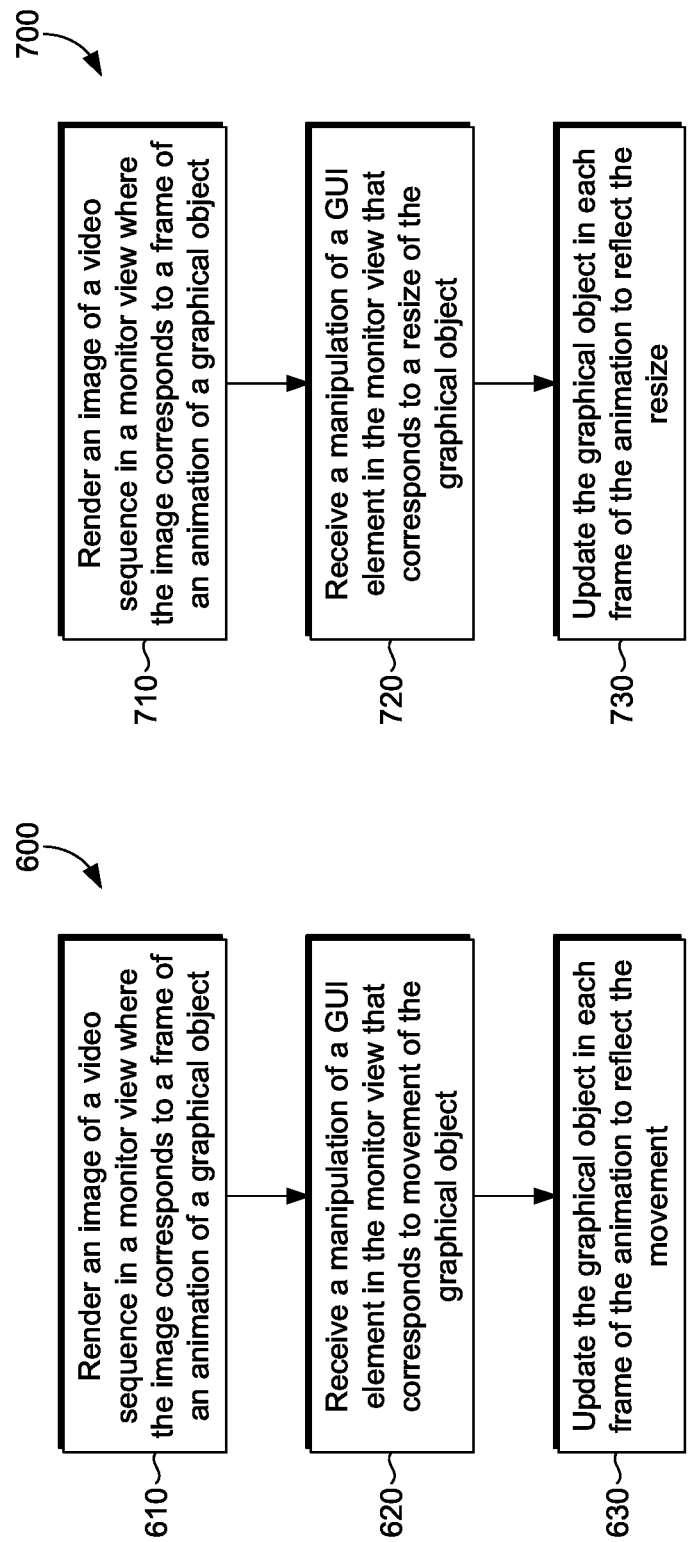

EDITING NESTED VIDEO SEQUENCES

BACKGROUND

Video editing software allows users to assemble a collection of graphical objects that include video, still images, graphics, and/or animations, into a video sequence that can be rendered as a composite digital video. The video sequence stores in an editable format presentation information about how to render the graphical objects, such as render locations, visual effects applied over the graphical objects, and keyframe information, to produce the composite digital video. Video editing software, such as Adobe® Premiere® Pro and Adobe Premiere Elements, often includes a graphical user interface (GUI) that allows the user to arrange the graphical objects of a video sequence into video clips in tracks on a timeline. A monitor view of the GUI assists the user in visualizing edits made to presentation information of graphical objects.

Some video editing software allows a video sequence to be used as a video clip in other video sequences. A video sequence is referred to as a nested video sequence when used in this manner and any video sequence containing it is referred to as its parent video sequence. When a parent video sequence is opened for editing in the GUI, a user may wish to edit a graphical object from one of its nested video sequences. To do so, a user opens a separate instance of the GUI that has a timeline and monitor view specific to editing and visualizing the nested video sequence. When the user has finished editing, the user returns to editing the parent video sequence. This approach is memory inefficient as it uses a separate instance of the GUI. Also, the user cannot easily determine whether edits made to a nested video sequence will achieve desired results in its parent video sequence. These problems can be compounded when the nested video sequence itself is a parent video sequence of other video sequences, and the graphical objects the user wishes to edit are from these other video sequences.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Aspects of the present disclosure relate to editing nested video sequences. A video sequence is referred to as a nested video sequence when used as a video clip in another video sequence, and the video sequence containing it is referred to as its parent video sequence. In various implementations, when a parent video sequence is opened for editing in a GUI, a user can edit graphical objects from its nested video sequences within the GUI. Thus, the user need not open a separate instance of the GUI specific to editing and visualizing a nested video sequence.

When a user selects the video clip, a monitor view of the GUI is updated to disable layers of the parent video sequence that are above the layer containing the video clip, and visual effects (e.g., visual filters, such as a blur filter, a sharpen filter, or a bevel filter) applied over the video clip in the parent video sequence, from being rendered therein. The user is able to edit and visualize the graphical objects unobscured by the visual effects and content from higher layers. However, layers of the parent video sequence that are below the layer containing the video clip are rendered in the monitor view. Thus, the user can edit and visualize the graphical objects in reference to content from lower layers of the parent video sequence to easily determine the impact of the edits. When the user deselects the video clip, the monitor view is updated to enable rendering of the higher layers and visual effects.

Further aspects of the present disclosure relate to editing an animation of a graphical object of a video sequence. The graphical object can be from a nested video sequence, and the editing can be enabled by the selection of the video clip described above. However, these aspects of the present disclosure are more generally applicable to the editing of video sequences. An image is rendered in a monitor view and corresponds to a frame (e.g., a keyframe) of an animation of the graphical object. A user manipulates a GUI element corresponding to the graphical object. The manipulation can correspond to an alteration (e.g., a resize and/or a movement) of the graphical object. Typically, the alteration (to presentation information) is only applied to the graphical object in the frame. In accordance with the present disclosure, the alteration is applied to each frame (e.g., keyframe) of the animation. Thus, the user need not perform separate manipulations to alter each frame of the animation.

In further respects, the GUI imposes restrictions on the manipulation of the GUI element, such as by bounding values of the manipulation (e.g., to a range of values) and corresponding values of the alteration to the animation. For example, where the alteration is a movement of the graphical object in the animation, the restrictions may prevent the user from moving the GUI element outside of certain ranges of values (e.g., a range on the x-axis and a range on the y-axis). This can be accomplished by defining the ranges based on the monitor view so that the graphical object is restricted from being at least partially moved outside of the monitor view for each frame of the animation. For a resize, this can be accomplished by defining the ranges based on the monitor view so that the graphical object is restricted from being resized at least partially to outside of the monitor view for each frame of the animation. By bounding the values, the manipulation is more likely to result in a desirable alteration. These and other concepts are contemplated as being within the scope of the present disclosure.

BRIEF DESCRIPTION OF THE DRAWINGS

The present invention is described in detail below with reference to the attached drawing figures, wherein:

FIG. 4 is a flow diagram showing a method for editing nested video sequences in accordance with embodiments of the present disclosure;

FIG. 5 is a flow diagram showing a method for editing nested video sequences in accordance with embodiments of the present disclosure;

FIG. 6 is a flow diagram showing a method for editing an animation of a graphical object in accordance with embodiments of the present disclosure; and FIG. 7 is a flow diagram showing a method for editing an animation of a graphical object in accordance with embodiments of the present disclosure.

DETAILED DESCRIPTION

Figure 1A:
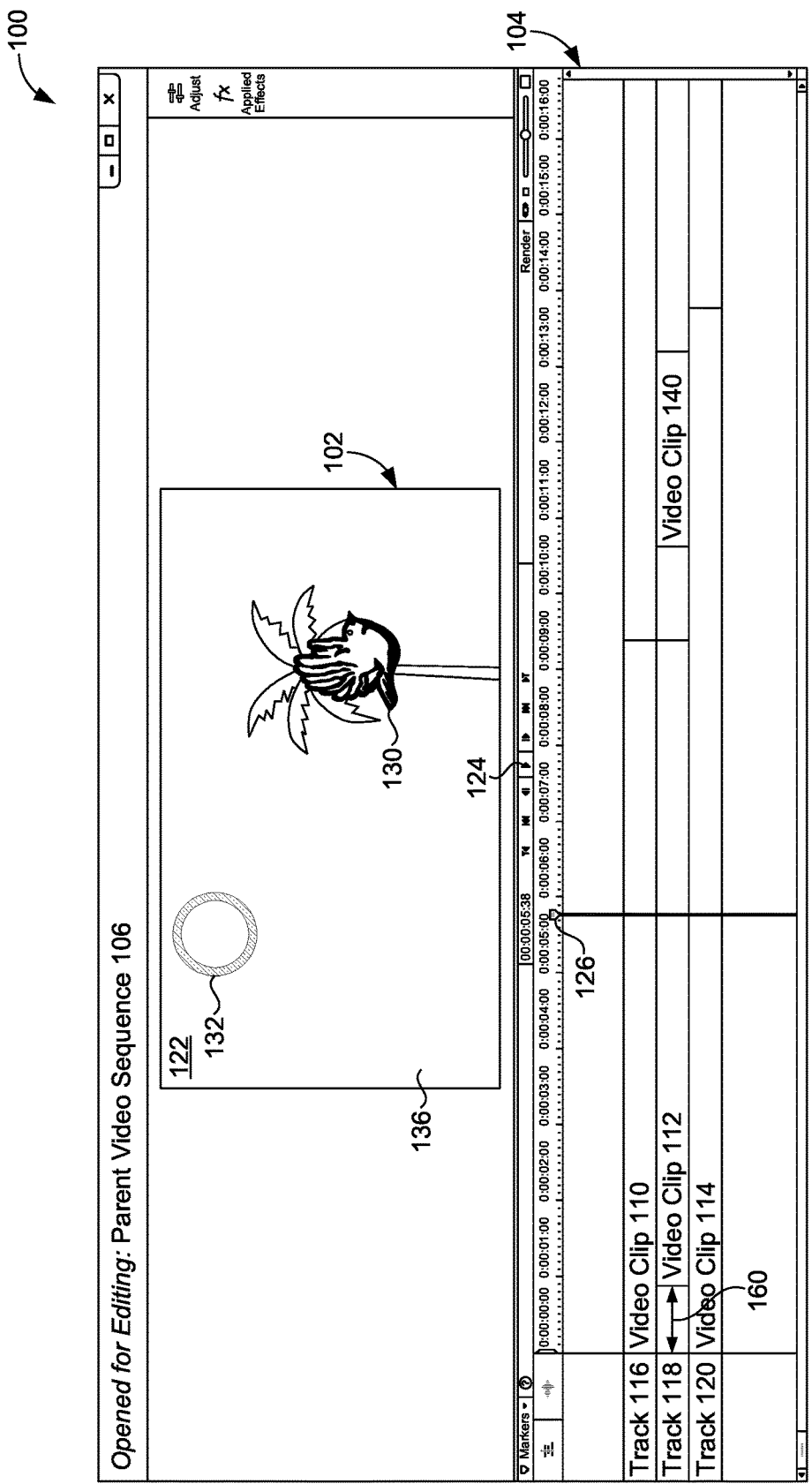
FIG. 1A illustrates an example of a GUI of video editing software in accordance with embodiments of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As used herein, a "graphical object" refers to a computer representation of one or more visual media, such as video, still images, graphics, and/or animations.

A "video sequence" refers to an editable version of a composite digital video that includes presentation information corresponding to graphical objects used to produce the composite digital video.

"Presentation information" refers to any information that describes how to render visual media in a composite digital video. Examples of presentation information include render locations of graphical objects, visual effects applied over the graphical objects, and keyframe information of graphical objects. Other examples of presentation information include video clips and tracks.

As used herein, a "visual effect" applies a predetermined graphical modification to the rendering of a graphical object while preserving the state of the graphical object prior to being applied thereto. In some cases, a visual effect may be applied to a layer (e.g., to each graphical object in the layer). In other cases, a visual effect may be applied to graphical objects on an individual or group basis.

A "video clip" refers to a temporal arrangement of one or more graphical objects and a "track," such as a video track, refers to a temporal arrangement of one or more clips (e.g., video clips) within the video sequence.

As used herein, a "layer" of a video sequence refers to a grouping of graphical objects that are assigned to a common render level in the video sequence. A layer controls the order in which the grouping of graphical objects therein are drawn with respect to graphical objects that are not assigned to, or are outside of the layer. When referring to layers in terms of relative heights, a higher layer refers to a layer having a higher render level than a lower layer (e.g., a higher layer is rendered over a lower layer) to produce images, or frames, of a composite digital video. Each track in a video sequence can correspond to a respective layer of the video sequence. Video clips in higher layers of a video sequence are typically rendered over video clips in lower layers of the video sequence.

Herein, a video sequence is referred to as a "nested video sequence" when used as a video clip of another video sequence. The video sequence containing the video clip is referred to as its "parent video clip." In some cases, a nested video sequence with respect to one video sequence can be a parent video sequence with respect to another video sequence by using that video sequence in one of its video clips. A video clip that has no corresponding nested video sequence is referred to as an "embedded video clip." A nested video sequence is in a format similar to its parent video sequence that allows it to be accessed for editing separately from its parent video sequence. Changes made by the editing of the nested video sequence are typically automatically reflected in the parent video sequence. In contrast, a parent video sequence must be accessed to edit its embedded video clips.

A "monitor view" refers to a portion of a GUI, such as a window, that presents renderings of a video sequence that is opened for editing in the GUI.

A "timeline" refers to a portion of the GUI that presents visual representations of the temporal arrangement of video clips within the video sequence.

In some respects, the present disclosure relates to video editing software that allows the user to edit graphical objects from nested video sequences from within a GUI that has the parent video sequences opened for editing. Thus, a separate instance of the GUI is not required to achieve the editing.

From within the GUI, the user can select a video clip that corresponds to a nested video sequence of the parent video sequence. A timeline and monitor view corresponding to the parent video sequence may be concurrently displayed to a user in the same display, or screen. In some cases, a timeline of the GUI includes a representation of video clips of the parent video sequence. The user may select any of the various elements of the parent video sequence in the timeline, such as the video clips and/or tracks (e.g., individually by clicking on corresponding GUI elements).

Assume the user selects a video clip corresponding to a nested video sequence using the timeline, such as by clicking (e.g., double-clicking) on its representation in the timeline. In response to the user selecting the video clip, a monitor view of the GUI is updated for editing the graphical objects from the nested video sequence. In some respects, this can include disabling layers of the parent video sequence that are above the layer containing the video clip from being rendered in the monitor view. This can also include disabling visual effects (e.g., visual filters, such as a blur filter, a sharpen filter, or a bevel filter) applied over the video clip in the parent video sequence from being rendered in the monitor view. A corresponding image is rendered in the monitor view that excludes the disabled content from the rendering. The user is thereby able to edit and visualize the graphical objects from the nested video sequence unobscured by the visual effects and/or content from higher layers.

In further respects, during the rendering of images in the monitor view, one or more layers of the parent video sequence that are below the layer containing the video clip are enabled for rendering in the monitor view. Thus, the user can edit and visualize the graphical objects in reference to content from lower layers of the parent video sequence to easily determine the impact of the edits. The higher layers may be disabled, such that the monitor view displays the lower layers. The timeline of the GUI may indicate which layers are enabled and disabled to the user while the lower layers are displayed in the monitor view. Also, the nested video sequence may be displayed in the timeline of the parent video sequence along with an indication that the nested video sequence has been selected by the user for editing. When the user deselects the video clip (e.g., by clicking outside of the representation of the video clip in the timeline), the monitor view is updated to enable rendering of the higher layers and visual effects. An updated image is rendered in the monitor view that includes the enabled content in the rendering.

In some cases, the selecting of the video clip enables the editing of the graphical objects of the nested video sequence. For example, in response to the selecting, the GUI can enable the user to interact with GUI elements that correspond to the graphical objects to edit presentation information of those graphical objects. These GUI elements may be displayed over images of the parent video sequence in the monitor view. Further, a GUI element can be displayed based on the presentation information of its corresponding graphical object. For example, the size of a GUI rectangle can be proportional to the size of the graphical object and be at a location corresponding to a location of the graphical object in the image.

By manipulating the GUI elements (e.g., using a mouse or other input device), the user can cause corresponding edits to be applied to presentation information associated with the graphical objects, such as their size or location. For example, manipulating the size or location of a GUI element can cause a proportional change to the size or location of its corresponding graphical object. The monitor view is updated to reflect the edits to the graphical objects so the user can visualize their impact on the parent video sequence.

Further aspects of the present disclosure relate to editing an animation of a graphical object of a video sequence. The graphical object can be from a nested video sequence, and the editing can be enabled by the selection of the video clip described above. However, these aspects of the present disclosure are more generally applicable to the editing of video sequences.

An image is rendered in a monitor view and corresponds to a frame of an animation of the graphical object. A user manipulates a GUI element over the image where the GUI element corresponds to the graphical object. The manipulation can correspond to an alteration (e.g., a resize and/or a movement) of the graphical object. Typically, the alteration is only applied to the graphical object in the frame. In accordance with the present disclosure, the alteration is applied to each frame of the animation. To achieve the same result, the user otherwise would have to separately manipulate the graphical object in each frame of the animation.

In further respects, the GUI imposes restrictions on the manipulation of the GUI element, such as by bounding values of the manipulation (e.g., to a range of values) and corresponding values of the alteration to the animation. For example, where the alteration is a movement of the graphical object in the animation, the restrictions may prevent the user from moving the GUI element outside of certain ranges of values (e.g., a range on the x-axis and a range on the y-axis). This can be accomplished by defining the ranges based on the monitor view so that the graphical object is restricted from being at least partially moved outside (at all or beyond a threshold amount) of the monitor view for each frame of the animation. For a resize, this can be accomplished by defining the ranges based on the monitor view so that the graphical object is restricted from being resized at least partially to outside of the monitor view for each frame of the animation. By bounding the values, the manipulation is more likely to result in a desirable alteration.

Figure 1B:
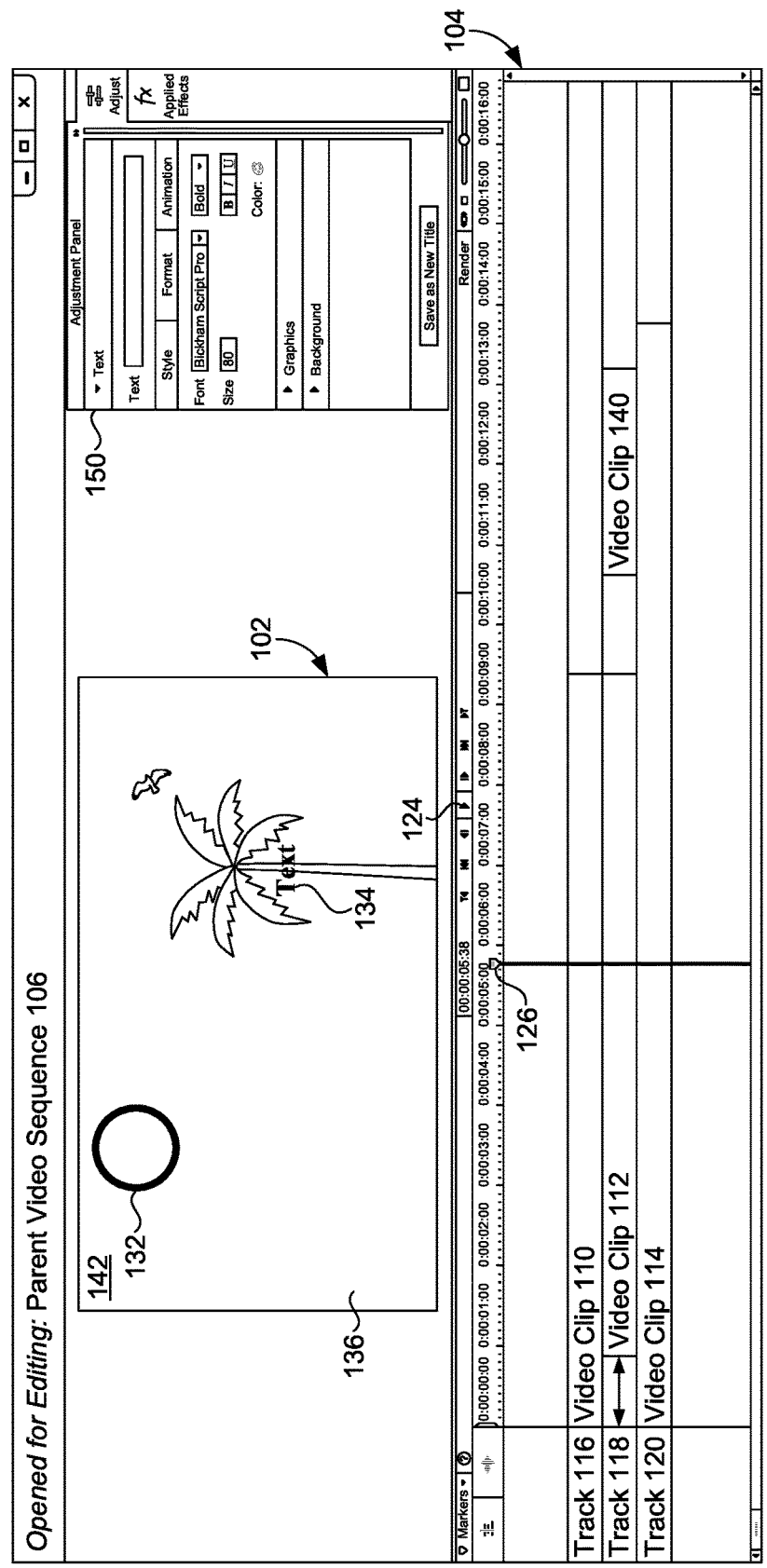
FIG. 1B illustrates an example of a GUI of video editing software in accordance with embodiments of the present disclosure.
Figure 1C:
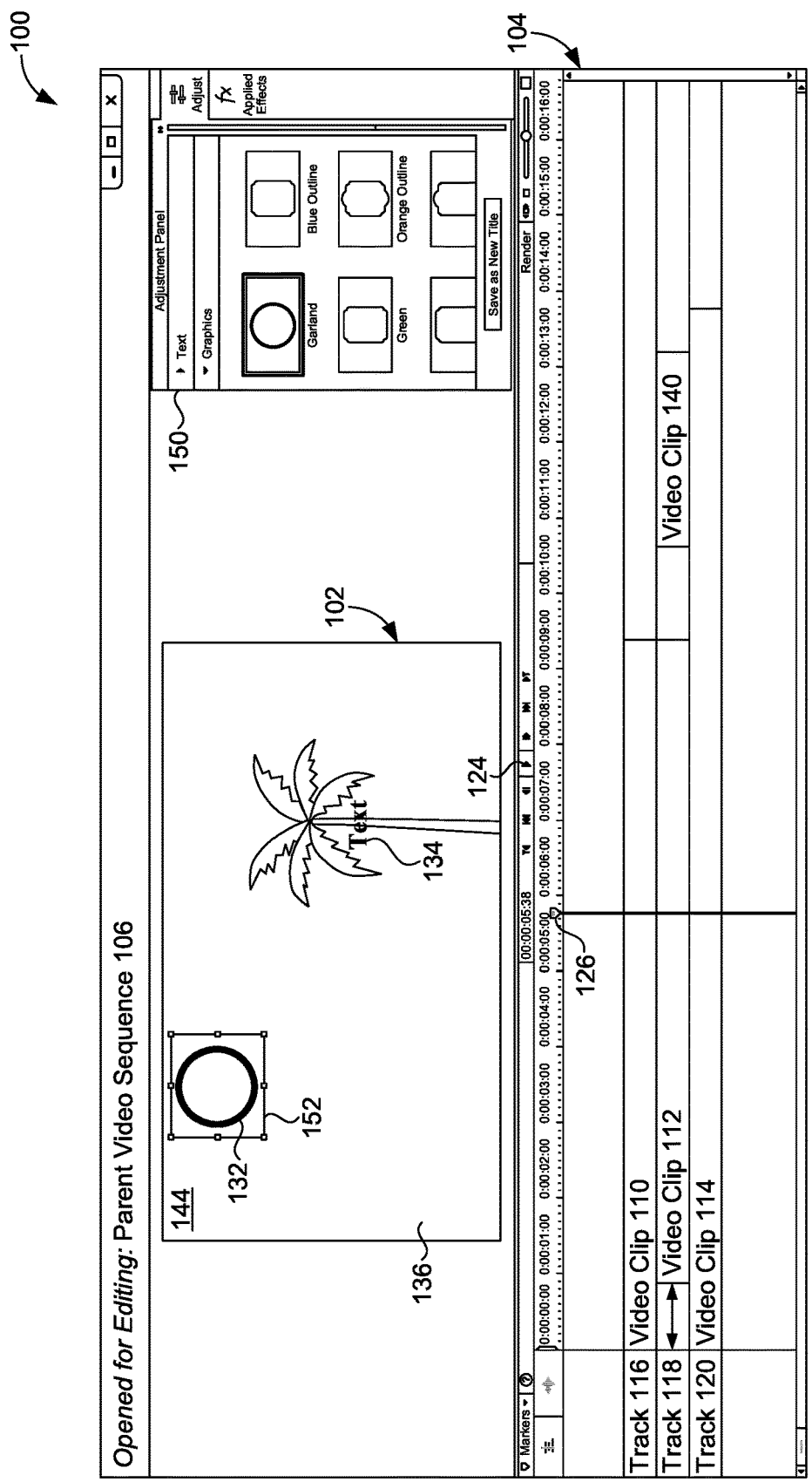
FIG. 1C illustrates an example of a GUI of video editing software in accordance with embodiments of the present disclosure.
Figure 1D:
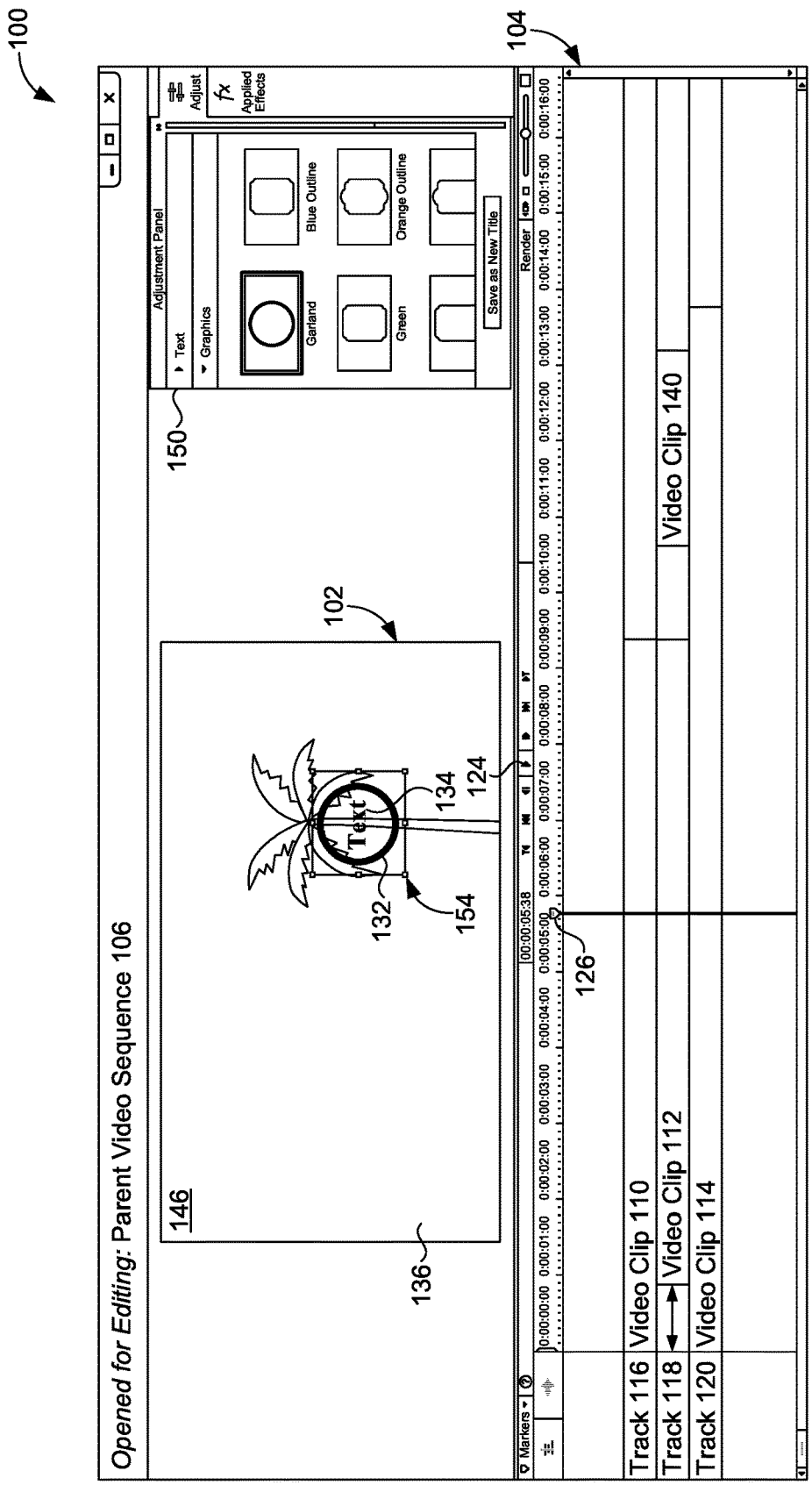
FIG. 1D illustrates an example of a GUI of video editing software in accordance with embodiments of the present disclosure.
Figure 1E:
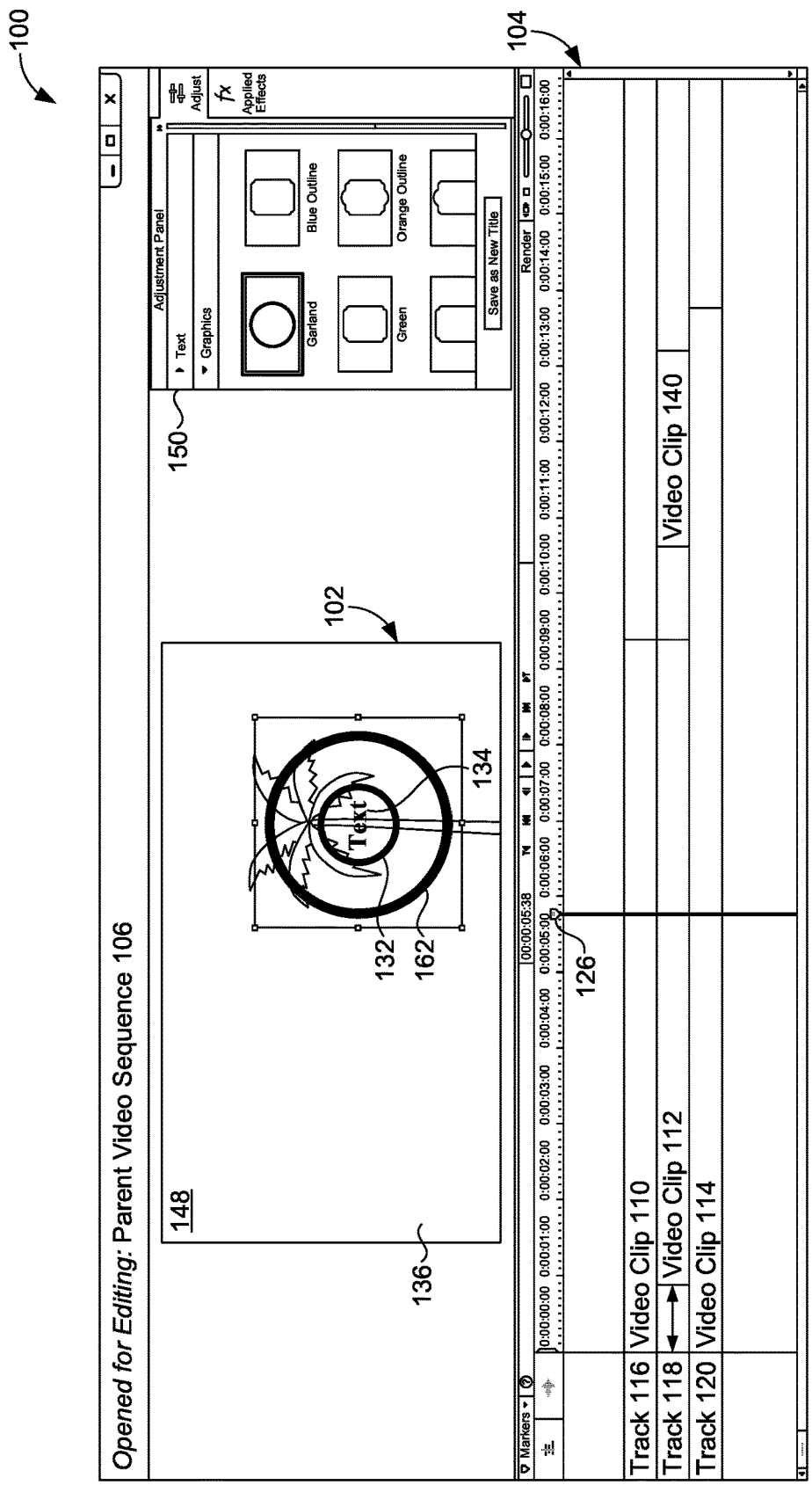
FIG. 1E illustrates an example of a GUI of video editing software in accordance with embodiments of the present disclosure.
Figure 1F:
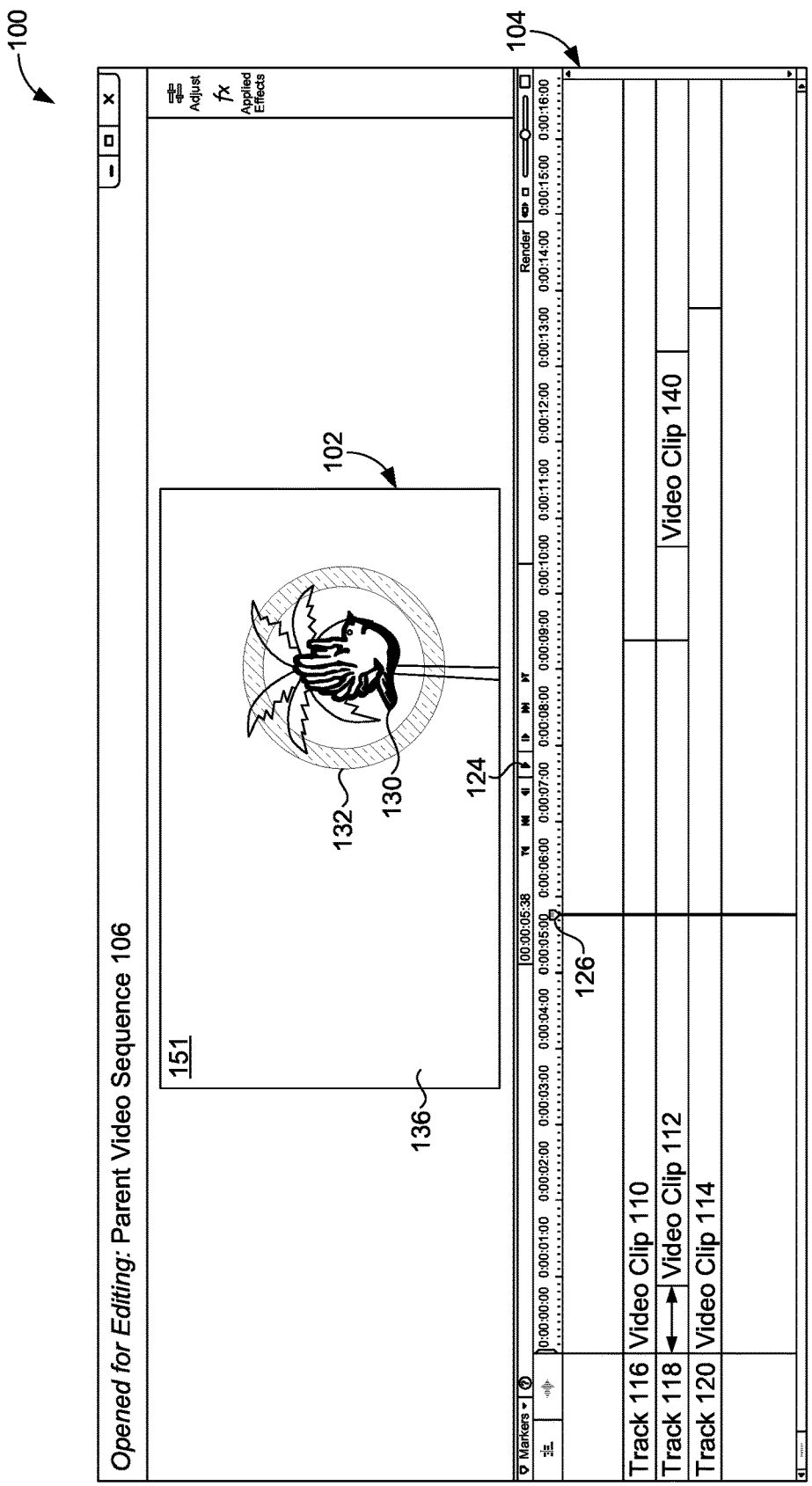
FIG. 1F illustrates an example of a GUI of video editing software in accordance with embodiments of the present disclosure.

Turning to FIGS. 1A, 1B, 1C, 1D, 1E, and 1F, these figures illustrate an example of a GUI of video editing software in accordance with embodiments of the present disclosure. In particular, each figure corresponds to GUI 100 of video editing software at a respective point in time. The figures are arranged in temporal order so that FIG. 1A represents GUI 100 at the earliest point in time and FIG. 1F represents GUI 100 at the latest point in time. As shown, GUI 100 includes monitor view 102 and timeline 104 and has parent video sequence 106 opened for editing therein.

Parent video sequence 106 comprises video clips 110, 112, and 114. Video clips 110, 112, and 114 are arranged into tracks 116, 118, and 120 of parent video sequence 106, respectively. Timeline 104 provides visual representations of tracks 116, 118, and 120, with visual representations of video clips 110, 112, and 114 arranged into their corresponding tracks. Tracks 116, 118, and 120 are video tracks of parent video sequence 106. Parent video sequence 106 may optionally comprise one or more other types of tracks, such as audio tracks, voice tracks, music tracks, and the like. In some implementations, each track can comprise multiple video clips. As an example, track 118 also includes video clip 140, which is indicated in timeline 104 as occurring at a later point in time in parent video sequence 106 than video clip 112.

As described above, parent video sequence 106 is opened for editing in GUI 100. When a user opens parent video sequence 106 for editing, this can cause parent video sequence 106 to be loaded into timeline 104 and monitor view 102. This can also enable the user to edit parent video sequence 106 and save those edits persistently. As shown, each track and associated video clip from parent video sequence 106 is loaded into timeline 104. When a video clip corresponds to a nested video sequence, the nested video sequence may be loaded into parent video sequence 106.

Also, as indicated in FIG. 1A, image 122 is loaded into monitor view 102 and corresponds to a rendering of each track of parent video sequence 106. Each track of parent video sequence 106 corresponds to a respective layer. GUI 100 renders images in monitor view 102 based on the arrangement of these layers. In particular, each video clip of a track is rendered at the same level and higher layers are rendered over lower layers. In timeline 104, higher layers are depicted above lower layers. Thus, the highest layer corresponds to track 116 and the lowest layer corresponds to track 120.

By rendering images in monitor view 102 from the tracks of parent video sequence, monitor view 102 can be used to preview what the composite digital video represented by parent video sequence 106 will look like once rendered. For example, each rendered image therein (e.g., image 122) can correspond to the composite digital video at a respective point in time. Current time indicator (CTI) 126 indicates the point in time that corresponds to the image currently depicted in monitor view 102 (image 122 in FIG. 1A). The user can manipulate CTI 126 in timeline 104 to change the point in time and corresponding image rendered in monitor view 102, such as by dragging CTI 126 along the x-axis running parallel to the greater extent of the tracks. The user may also use playback buttons, such as play button 124 to automatically change the point in time and CTI 126 while viewing a playback of parent video sequence 106.

In FIG. 1A, image 122 is rendered to include video clips from tracks 116, 118, and 120 at the point in time corresponding to CTI 126. This rendering includes video clips 110, 118, and 120. In doing so, graphical objects from each video clip are used for the rendering. Those graphical objects are depicted in monitor view 102 in their rendered states. Video clip 110 comprises graphical object 130 which corresponds to an animated vector graphic. The presentation information of graphical object 130 defines the position of graphical object 120 at each point in time in parent video sequence 106. Video clip 114 comprises graphical object 132 that corresponds an animated vector graphic, and graphical object 132 is depicted in FIG. 1B, and corresponds to a vector text graphic.

Graphical object 132 is not visible in FIG. 1A, because video clip 112 is on a lower layer of parent video sequence 106 than video clip 110. Video clip 114 comprises graphical object 136, which corresponds to a video. GUI 100 renders graphical object 130 over graphical object 136 in monitor view 102 because video clip 114 is on a lower layer of parent video sequence 106 than video clip 110.

In parent video sequence 106, video clips 110, 114, and 140 are embedded video clips that can be edited within GUI 100. In contrast, video clip 112 corresponds to a nested video sequence. A user that is editing parent video sequence 106 may desire to edit graphical objects from the nested video sequence, such as graphical objects 132 and 134. GUI 100 allows the user to edit graphical objects from the nested video sequence within GUI 100, while parent video sequence 106 is opened for editing therein. Thus, the user need not open a separate instance of the GUI specific to editing and visualizing the nested video sequence.

From within GUI 100, the user can select video clip 112 that corresponds to a nested video sequence of parent video sequence 106. For example, in FIG. 1A, the user can accomplish the selection by interacting with the representation of video clip 112 in timeline 104 of parent video sequence 106. In the present example, the user clicks (e.g., double-clicks) on the representation to perform the selection. It will be appreciated that any suitable input method can be employed, such as mouse input, touch input, or keyboard input.

FIG. 1B illustrates GUI 100, which reflects the result of the user selecting video clip 112 in FIG. 1A. In response to the user selecting video clip 112, monitor view 102 of GUI 100 is updated for editing graphical objects from the nested video sequence. This includes disabling each layer of parent video sequence 106 that is above the layer containing video clip 112 from being rendered in monitor view 102. While a layer is disabled, GUI 100 refrains from rendering video clips in the layer in monitor view 102. Thus, image 142, which is rendered in monitor view 102 in response to the selection, does not depict graphical object 130. As shown, the rendering of graphical object 134 from the nested video sequence is no longer obscured by graphical object 130 from video clip 110. This allows the user to better visualize the contents of the nested video sequence for editing. It is noted that in some cases, the user may selectively enable and disable rendering of the one or more of the layers above the selected video clip.

Also in response to the user selecting video clip 112, visual effects applied over video clip 112 in parent video sequence 106 are disabled from being rendered in monitor view 102. For example, FIG. 1B indicates that a transparency effect of video clip 112 is disabled in the rendering in monitor view 102. The visual effect may be part of parent video sequence 106 and contained in parent video sequence 106. By disabling each visual effect, the user can visualize the graphical objects of the nested video sequence as they would be rendered were the user to open the nested video sequence in a GUI specific to editing the nested video sequence. Thus, image 142, which is rendered in monitor view 102 in response to the selection, depicts graphical objects 132 and 134 without the transparency effect. It is noted that in some cases, the user may selectively enable and disable the visual effects. Further, in some implementations, the visual effects may be retained.

As described above, while video clip 112 remains selected, GUI 100 refrains from rendering images in monitor view 102 with the disabled features of parent video sequence 106 (unless the user selectively enables rendering of any of these features). The user is thereby able to edit and visualize graphical objects 132 and 134 from the nested video sequence unobscured by the visual effects and/or content from higher layers.

Also while video clip 112 remains selected, during the rendering of images in monitor view 102, one or more layers (e.g., each layer) of parent video sequence 106 that are below the layer containing video clip 112 are enabled for rendering in monitor view 102. This includes video clip 114 in the present example, and may include video clips from other tracks on lower layers when present. In response to the selection of video clip 112, GUI 100 may optionally identify each layer or track below track 118 and ensure they are enabled for rendering in monitor view 102. This can include enabling any disabled layers or tracks that are identified. In some implementations, the user may selectively enable and disable these layers or tracks while video clip 112 is selected.

In implementations where graphical objects from the lower layers are rendered in monitor view 102, the user is able to edit and visualize graphical objects 132 and 134 in reference to content from those layers. Thus, the user can easily determine the impact of the edits on the parent video sequence. FIGS. 1C, 1D, and 1E illustrate an example of the foregoing. In this example, the user changes the position of graphical object 132 and resizes graphical object 132 while video clip 112 is selected. The initial position and size is indicated in image 144 of FIG. 1C, the new position with the initial size is indicated in image 146 of FIG. 1D, and the new position with the new size is indicated in image 148 of FIG. 1E.

In response to selection of video clip 112, GUI 100 can enable editing of graphical objects from the nested video sequence. In particular, the user can edit the presentation information associated with the graphical objects. In some cases, the user can perform the edits by changing corresponding entries of forms in using a form based interface, such as adjustment panel 150. In addition, or instead, the user can perform the edits by interacting with monitor view 102. For example, in response to the user selecting video clip 112, GUI 100 can enable the user to select GUI elements in monitor view 102 that correspond to graphical objects in the nested video sequence (or ensure the GUI elements are selectable). In some implementations, the user is only able to select GUI elements in monitor view 102 that corresponds to graphical objects from the nested video sequence, as opposed to graphical objects in other video clips and/or layers of parent video sequence 106 (e.g., graphical object 136). In particular, while video clip 112 remains selected, the user may only be permitted to edit graphical objects from video clip 112 using monitor view 102 and/or adjustment panel 150.

The user can select a GUI element by interacting with the representation of its corresponding graphical object in the monitor view. For example, FIG. 1C shows GUI element 152, after the user has selected the GUI element by clicking on an area of monitor view 102 that corresponds to graphical object 132 (e.g., over the rendering of graphical object 132). Optionally, the selection of the GUI element updates adjustment panel 150 to display form elements corresponding to the graphical object. The user can similarly select other GUI elements in monitor view 102 and selecting a GUI element may cause the previously selected GUI element to become deselected.

As shown, GUI element 152 is a GUI rectangle. The user can manipulate GUI element 152 in monitor view 102 to edit its corresponding graphical object. This can include, for example, dragging GUI element 152 around monitor view 102 to a new position, as indicated in FIGS. 1D and 1E. Manipulating a value of GUI element 152 (e.g., its position) can alter corresponding presentation information of graphical object 132 (e.g., its position) when applied to graphical object 132 (e.g., by releasing a mouse button or lifting a finger from the display).

Manipulating GUI element 152 in monitor view 102 to edit graphical object 132 can also include resizing GUI element 152 by the user interacting with a resize node, such as node 154. FIG. 1D can correspond to GUI element 152 prior to the resize and FIG. 1E can correspond to GUI element 152 during the manipulation that results in the resize. Manipulating a value of GUI element 152 (e.g., its size) can alter corresponding presentation information of graphical object 132 (e.g., its size) when applied to graphical object 132 (e.g., by releasing a mouse button or lifting a finger from the display).

In some implementations, the nested video sequence corresponding to video clip 112 has a different resolution and aspect ratio than parent video sequence 106. Furthermore, GUI 100 scale fits content of the nested video sequence to fill monitor view 102 based on the selecting of its corresponding video clip. In some cases, monitor view 102 uses a coordinate space of parent video sequence 106 such that manipulations to values of the GUI elements cannot be directly applied to the graphical objects of the nested video sequence. In these implementations, GUI 100 transforms the manipulations of the GUI elements from the coordinate space of parent video sequence 106 to the coordinate space of the nested vide sequence in order to apply the manipulations to the graphical objects from the nested video sequence.

As an example, assume parent video sequence 106 has a resolution of 1920×1080 and the nested video sequence has a resolution of 1440×1080. Also assume the user moves GUI element 152 in the coordinate space of parent video sequence 106. GUI 100 translates the delta values of the movement of GUI element 152 based on the difference between the resolutions and aspect ratios of the video sequences in order to compensate for those differences. The translated values are then applied to the graphical objects (e.g., to the nested video sequence). The results of applying the translated values are also translated to the coordinate space of the parent video sequence in a reverse fashion in order to determine render positions for displaying visual feedback of GUI element 152 (e.g., manipulation result preview 162 and the GUI rectangle) to monitor view 102 (e.g., to display the GUI rectangle at a new position or at a new size).

In further respects, GUI 100 may translate the point in time at which the manipulations are applied to the graphical objects (e.g., to the nested video sequence) from parent video sequence 106 to the nested video sequence. For example, as indicated in timeline 104, video clip 112 starts after the start time of parent video sequence 106. GUI 100 can translate the point in time depicted in monitor view 102 (e.g., corresponding to CTI 126) by offset time 160 and use that adjusted point in time to apply the manipulations to the nested video sequence.

The user can deselect video clip 112, such as by clicking outside of the representation of the video clip in timeline 104, clicking on another video clip, or otherwise interacting with the GUI in some predefined manner In response to the deselection, GUI 100 can enable rendering of any higher layers and/or visual effects that are disabled. Furthermore, an updated image can be automatically rendered in monitor view 102 that includes the enabled content in the rendering. Additionally, GUI 100 may disable the ability of the user to edit the graphical objects from the nested video sequence, such as via interaction with monitor view 102. Thus, by deselecting video clip 112, the user can return to editing other portions of parent video sequence 106. FIG. 1F corresponds to GUI 100 resulting from the user deselecting video clip 112 upon completing the manipulation and altering illustrated in FIG. 1E. Thus, image 150 is rendered in monitor view 102 using graphical object 130.

It is noted that in some implementations, the edits the user makes to the graphical objects of the nested video sequence are committed to the nested video sequence. When the user later opens the nested video sequence for editing, the previous edits made when the parent video sequence was opened for editing can be reflected in the nested video sequence. In other cases, the edits can be committed in the parent video sequence, while preserving the original configuration in the nested video sequence. In this scenario, when the user later opens the nested video sequence for editing, the previous edits may not be reflected in the nested video sequence. However, they will be reflected when the user later opens the parent video sequence.

It is further noted that the graphical objects from the nested video sequence can themselves be from another video clip of the nested video sequence that corresponds to another video sequence. When a use edits the graphical object, the edits can be applied to either or both of these video sequences. Thus, using the foregoing approach, the user may edit graphical objects from various video sequences that may be embedded multiple video sequences deep in the nested video sequence using a flattened image rendered in monitor view 102. Edits made to a graphical object may be committed to the nested video sequence that has the graphical object embedded therein.

Figure 2A:
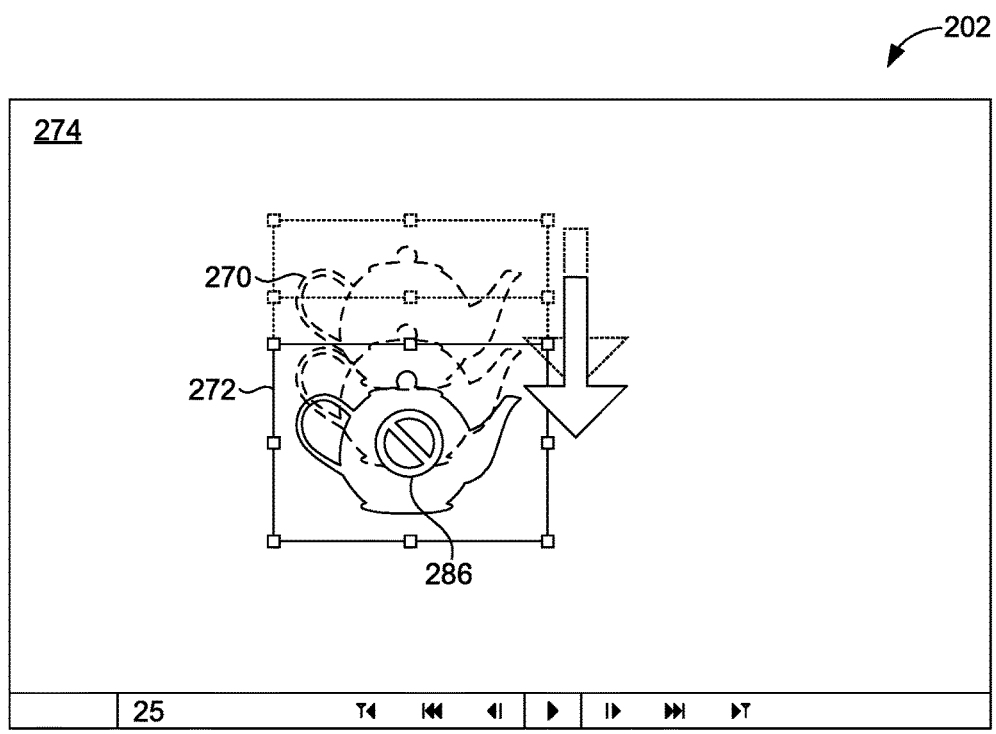
FIG. 2A illustrates an example of a monitor view of video editing software in accordance with embodiments of the present disclosure.

As described above, further aspects of the present disclosure relate to editing an animation of a graphical object of a video sequence. FIG. 2A shows monitor view 202 comprising an image rendered with graphical object 270 from a video sequence. Monitor view 202 can correspond to monitor view 102 in FIG. 1. For example, graphical object 270 could be from the nested video sequence corresponding to video clip 112, as one example. Furthermore, the editing can be enabled by the selection of video clip 112 described above with GUI element 272 allowing for similar manipulation as GUI element 152. However, these aspects of the present disclosure are more generally applicable to the editing of video sequences. Thus, this approach to editing could be implemented on graphical elements from other video clips of parent video sequence 106 in GUI 100 and/or while video clip 112 is not selected for editing as described above. Furthermore, this approach can be employed in a GUI other than GUI 100, described above.

In FIG. 2A, image 274 rendered in monitor view 202 corresponds to animation 280 of graphical object 270. Animation 280 is a keyframe-based animation, by way of example, that comprises a plurality of frames (e.g., keyframes). Keyframes can be used to set presentation information (e.g., parameters) for motion, effects, audio, and many other properties of a graphical object, that are animated over time. A keyframe marks a point in time where a value is specified for a layer property, such as spatial position, opacity, or audio volume. Values between keyframes are interpolated in the animation. Typically a keyframe-based animation comprises at least two keyframes one for an initial state, and one for a final state.

In the present example, animation 280 has fifty-five frames (e.g., keyframes). Image 274 in FIG. 2A is rendered in monitor view 202 based on frame 25 of animation 280. Animation 280 comprises presentation information 282A that defines the spatial position of graphical object 270 at each frame of the animation. A user can manipulates GUI element 272 corresponding to graphical object 270. In the example shown, the manipulation corresponds to an alteration to the spatial position (i.e., a movement) of graphical object 270. Similar to what was described above with respect to GUI element 152, the manipulation can be accomplished by the user dragging GUI element 152 around monitor view 202 with visual feedback being updated throughout to provide a preview of graphical object 270 at the current values (e.g., spatial positions) of the manipulation. When the manipulation is complete, such as when the user releases the mouse button or otherwise provides input that corresponds to completion of the manipulation, the corresponding alteration can be applied to graphical object 270.

In typical approaches, the alteration is only applied to graphical object 270 in a single frame (e.g., frame 25 in the present example) corresponding to image 274. In accordance with the present disclosure, the alteration is applied to each frame of the animation. Thus, the user can manipulate GUI element 272 with respect to graphical object 270 in image 274 and a corresponding alteration is applied to each of the fifty-five frames of animation 280. The user need not separately alter each frame (e.g., keyframe) of the animation to achieve a desired result. Presentation information 282A corresponds to presentation information of animation 280 prior to the manipulation being applied to animation 280 and presentation information 282B corresponds to an example of the presentation information after the corresponding alteration is applied to each frame of animation 280.

Figure 2B:
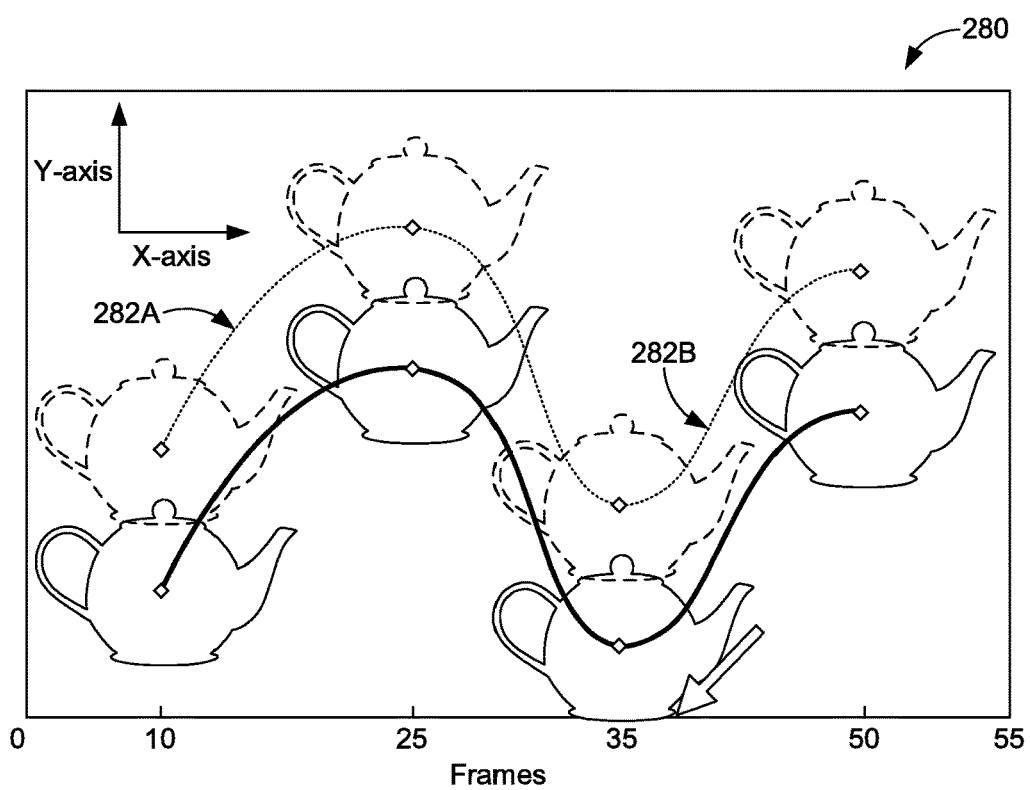
FIG. 2B illustrates an example of an animation of a graphical object in accordance with embodiments of the present disclosure.

In some cases, the GUI (e.g., GUI 100) imposes restrictions on the manipulation of GUI element 272, such as by bounding values of the manipulation (e.g., to a range of values) and corresponding values of the alteration to the animation. In the present example, the restrictions are configured to prevent the user from moving GUI element 272 outside of ranges of values (e.g., a range on the x-axis and a range on the y-axis). The GUI defined the ranges, in the present example, based on dimensions of monitor view 202 so that graphical object 270 is restricted from being at least partially moved outside (at all or beyond a threshold amount) of monitor view 202 for each frame of animation 280. As indicated in FIG. 2B, the bottom border of monitor view 202 is configured as a movement boundary for each frame of animation 280. Similarly, the top, left, and right borders are configured as movement boundaries for each frame of animation 280.

Thus, the user is restricted from altering the position of GUI element 272 beyond values that would result in a frame of animation 280 being at least partially located outside of monitor view 202. The GUI can present restriction violation indicator 286 on the visual feedback preview of the moved graphical object based on the GUI detecting that the user is attempting to violate one or more of the restrictions.

As another potential restriction, the GUI can restrict the user from moving the graphical object into a position that is overlapping (at all or beyond a threshold amount) any other graphical object in the currently displayed image with respect to the current frame and/or each frame of the animation. Thus, similar to the foregoing, other graphical objects in monitor view 202 can act as boundaries to the movement of GUI element 272 and the corresponding alteration of the position of graphical object 270. The user can optionally bypass the movement restrictions, such as by providing an explicit instruction to override the restrictions.

In some cases, the GUI determines a change to an X-axis value (deltaX) and a change to a Y-axis value for a potential alteration to X-axis and Y-axis values of graphical object 270 in each frame. In particular, the GUI determines these values from corresponding changes between the initial and current the position of GUI element 272. For each frame, the GUI applies the deltaX to the X-axis value to determine a potential X-axis value (newX) and applies the deltaY to the Y-axis value to determine a potential Y-axis value (newY) for graphical object 270 in the frame. If newX and newY are such that graphical object 270 would overlap any other graphical object depicted in monitor view 202 (or optionally in any frame of animations of those graphical objects), a violation of a restriction is detected. A restriction may be enforced unless the user explicitly confirms they wish to violate the restriction.

Figure 3A:
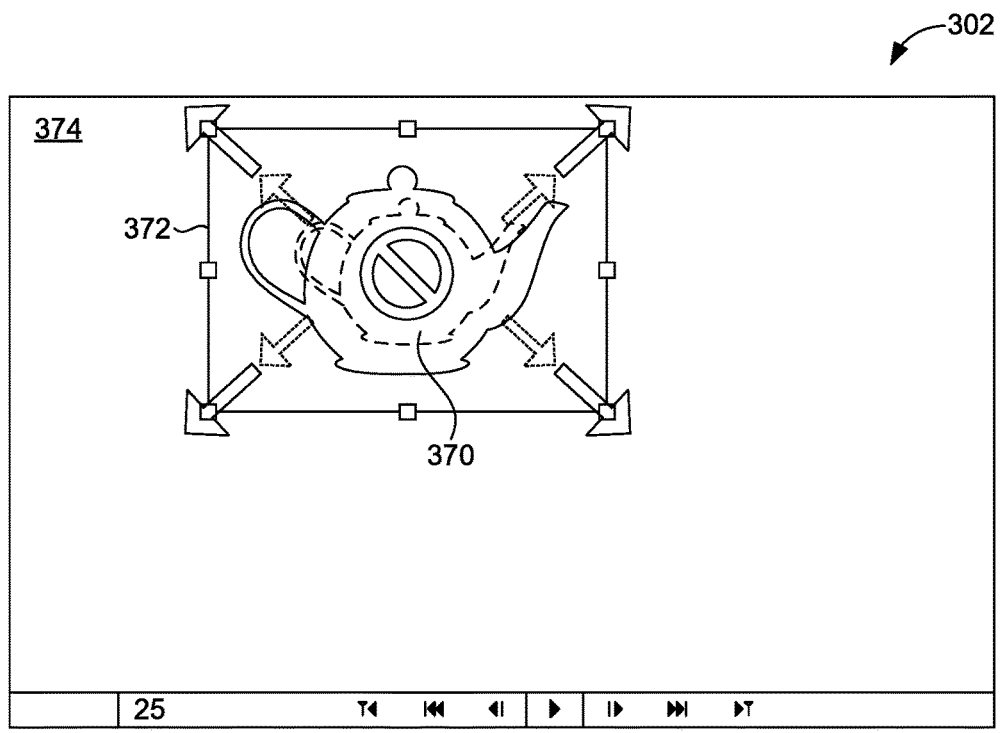
FIG. 3A illustrates an example of a monitor view of video editing software in accordance with embodiments of the present disclosure.
Figure 3B:
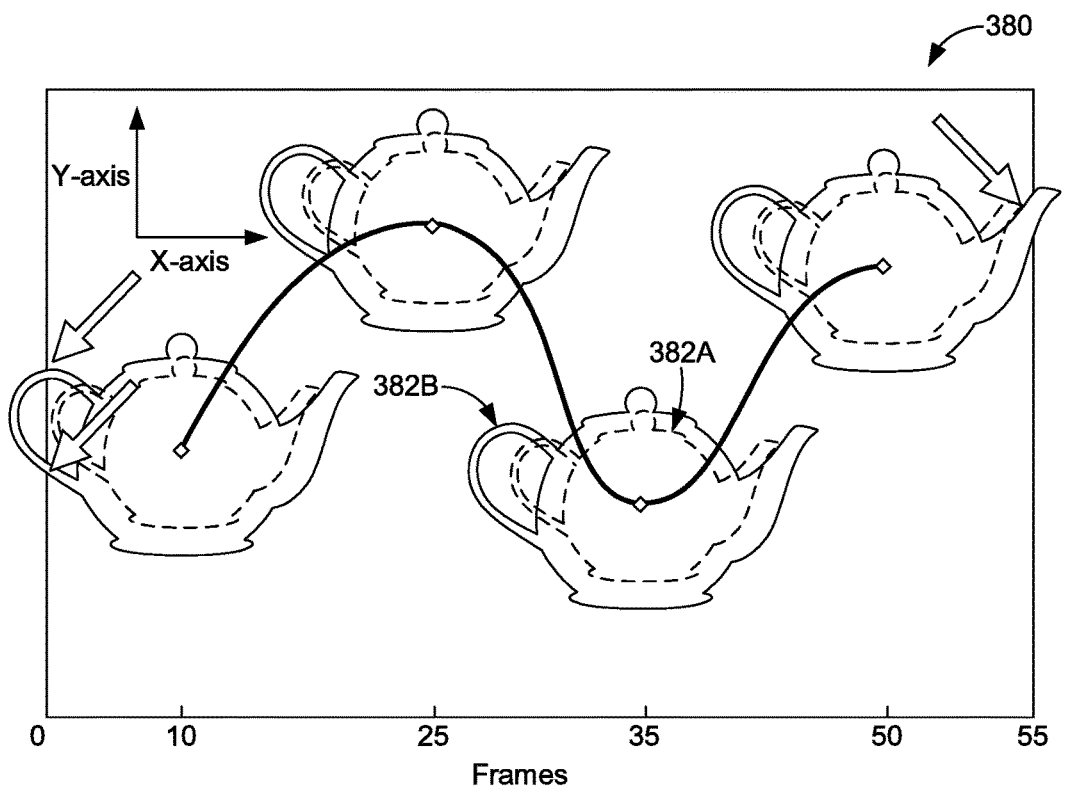
FIG. 3B illustrates an example of an animation of a graphical object in accordance with embodiments of the present disclosure.

FIGS. 3A and 3B illustrate another example of a GUI imposing restrictions on alteration to presentation information associated with a graphical object. FIGS. 3A and 3B are primarily distinguished from FIGS. 2A and 2B in that the restriction are imposed upon a resize of a graphical object as opposed to a movement of the graphical object. Monitor view 302 corresponds to monitor view 202 in FIG. 2A, GUI element 372 corresponds to GUI element 272 in FIG. 2A, graphical object 370 corresponds to graphical object 270 in FIG. 2A, and warning indicator 386 corresponds to restriction violation indicator 286 in FIG. 2A. In FIG. 3B, presentation information 382A corresponds to presentation information 282A in FIG. 2B and presentation information 382B corresponds to presentation information 282B in FIG. 2B.

At the current point in time (e.g., keyframe time) where the resize is happening (corresponding to image 374), the GUI determines the deltaX and deltaY based on a bounding box by which graphical object 370 is currently resized. The GUI determines a new scaling factors at the current point in time as:

$$deltaXF = \frac{deltaX}{width},$$

-continued $$newScaleWidthF = currentScaleWidthF + deltaXF,$$

$$deltaYF = \frac{deltaY}{height}, \text{ and}$$

$$newScaleHeightF = currentScaleHeightF + deltaYF.$$

The GUI further determines the percentage by which the scaling factor is changed at the current point in time as:

$$PercentageDeltaScaleXF = \frac{(newScaleWidthF - newScaleWidthF) * 100}{currentScaleWidthF}, \text{ and}$$

$$PercentageDeltaScaleYF = \frac{(newScaleHeightF - newScaleHeightF) * 100}{currentScaleHeightF}.$$

For each frame of animation 380, the presentation information of the frame is modified proportionately using PercentageDeltaScaleXF and PercentageDeltaScaleYF. The new scale factor values for each frame are calculated as:

$$newScaleWidthF = currentScaleWidthF + \frac{(percentageDeltaScaleXF * currentScaleWidthF)}{100}, \text{ and}$$

$$newScaleHeightF = currentScaleHeightF + \frac{(percentageDeltaScaleYF * currentScaleHeightF)}{100}.$$

In case newWidthX and newHeightY of the recalculated bounding box are such that graphical object 370 would be resized to outside of monitor view 302 (at all or beyond a threshold amount), a violation of a restriction can be detected and imposed on the resize. In addition, or instead, where newWidthX and newHeightY are such that graphical object 370 would be resized to overlap (at all or beyond a threshold amount) any other graphical object in the currently displayed image with respect to the current frame and/or each frame of the animation, a violation of a restriction can be detected and imposed on the resize. Similar to a movement restriction, the user may explicitly opt to override the restriction imposed on the resize.

Referring now to FIG. 4, a flow diagram is provided showing an embodiment of a method 400 for editing nested video sequences. Each block of method 400 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 410, method 400 includes receiving a selection of a video clip corresponding to a nested video sequence. For example, GUI 100 can receive a selection of video clip 112 in FIG. 1A, which corresponds to a nested video sequence of parent video sequence 106.

At block 420, method 400 includes disabling higher layers from being rendered in a monitor view. For example, in response to the selection, GUI 100 can disable the layer corresponding to track 116 from being rendered in monitor view 102 based on the layer being above the layer that includes video clip 112. GUI 100 may also disable each visual effect applied over the layer comprising video clip 112 from being rendered in monitor view 102.

At block 430, method 400 includes rendering an image while the higher layers are disabled. For example, GUI 100 can render image 142 of parent video sequence 106 in monitor view 102, as shown in FIG. 1B.

At block 440, method 400 includes receiving a manipulation of a GUI element. For example, GUI 100 can receive a manipulation of GUI element 152 while each higher layer is disabled from being rendered in monitor view 102 by the disabling, as indicated by FIG. 1C. GUI element 152 can correspond to graphical object 132 from the nested video sequence.

At block 450, method 400 includes applying the manipulation to a graphical object from the nested video sequence. For example, GUI 100 can apply the manipulation to graphical object 132 from the nested video sequence, as indicated in FIGS. 1D and 1E.

Referring now to FIG. 5, a flow diagram is provided showing one embodiment of a method 500 for editing nested video sequences. At block 510, method 500 includes receiving a selection of a video clip corresponding to a nested video sequence. For example, in FIG. 1A, GUI 100 can receive a selection of video clip 112 caused by a user double clicking on the representation of video clip 112 in timeline 104.

At block 520, method 500 includes rendering an image of the parent video sequence while each higher layer is disabled from the rendering. For example, in response to the selection, GUI 100 can render image 142 of parent video sequence 106 in monitor view 102 while rendering of each higher layer of parent video sequence 106 than a given layer that comprises video clip 112 is disabled in monitor view 102 by the selection, as shown in FIG. 1B.

At block 530, method 500 includes receiving a manipulation of a GUI element. For example, GUI 100 can receive a manipulation of a manipulation by the user of GUI element 152 that corresponds to the nested video sequence, while the rendering of each higher layer of parent video sequence 106 is disabled in monitor view by the selection, as indicated in FIGS. 1C and 1D.

At block 540, method 500 includes rendering an updated image of the parent video sequence that reflects the manipulation while each higher layer is disabled from the rendering. For example, in response to the manipulation, image 146 of the parent video sequence can be rendered in monitor view 102 that reflects an application of the manipulation to the nested video sequence while the rendering of each higher layer of the parent video sequence is disabled in monitor view 102 by the selection, as shown in FIG. 1E.

Referring now to FIG. 6, a flow diagram is provided showing one embodiment of a method 600 for editing an animation of a graphical object. At block 610, method 600 includes rendering an image of a video sequence in a monitor view where the image corresponds to a frame of an animation of a graphical object. For example, a GUI can render image 274 of FIG. 2A of a video sequence in monitor view 202 where image 274 corresponds to frame 25 of animation 280 of graphical object 270.

At block 620, method 600 includes receiving a manipulation of a GUI element in the monitor view that corresponds to movement of the graphical object. For example, the GUI can receive a manipulation of GUI element 272 that corresponds to movement of graphical object 270, as indicated in FIG. 2A.

At block 630, method 600 includes updating the graphical object in each frame of the animation to reflect the movement. For example, the GUI can adjust presentation information 282A for each frame of graphical object 270 in order to move graphical object 270 by the same delta position(s) for each frame to result in presentation information 282B. The delta position(s) can be proportional to delta positions of GUI element 272 caused by the manipulation.

Referring now to FIG. 7, a flow diagram is provided showing one embodiment of a method 700 for editing an animation of a graphical object. At block 710, method 700 includes rendering an image of a video sequence in a monitor view where the image corresponds to a frame of an animation of a graphical object. For example, a GUI can render image 374 of FIG. 3A of a video sequence in monitor view 302 where image 374 corresponds to frame 25 of animation 380 of graphical object 370.

At block 720, method 700 includes receiving a manipulation of a GUI element in the monitor view that corresponds to a resize of the graphical object. For example, the GUI can receive a manipulation of GUI element 372 that corresponds to a resize of graphical object 370, as indicated in FIG. 3A.

At block 730, method 700 includes updating the graphical object in each frame of the animation to reflect the resize. For example, the GUI can adjust presentation information 382A for each frame of graphical object 370 in order to resize graphical object 370 by the same delta position(s) for each frame to result in presentation information 382B. The delta position(s) can be proportional to delta positions of GUI element 372 caused by the manipulation.

Figure 8:
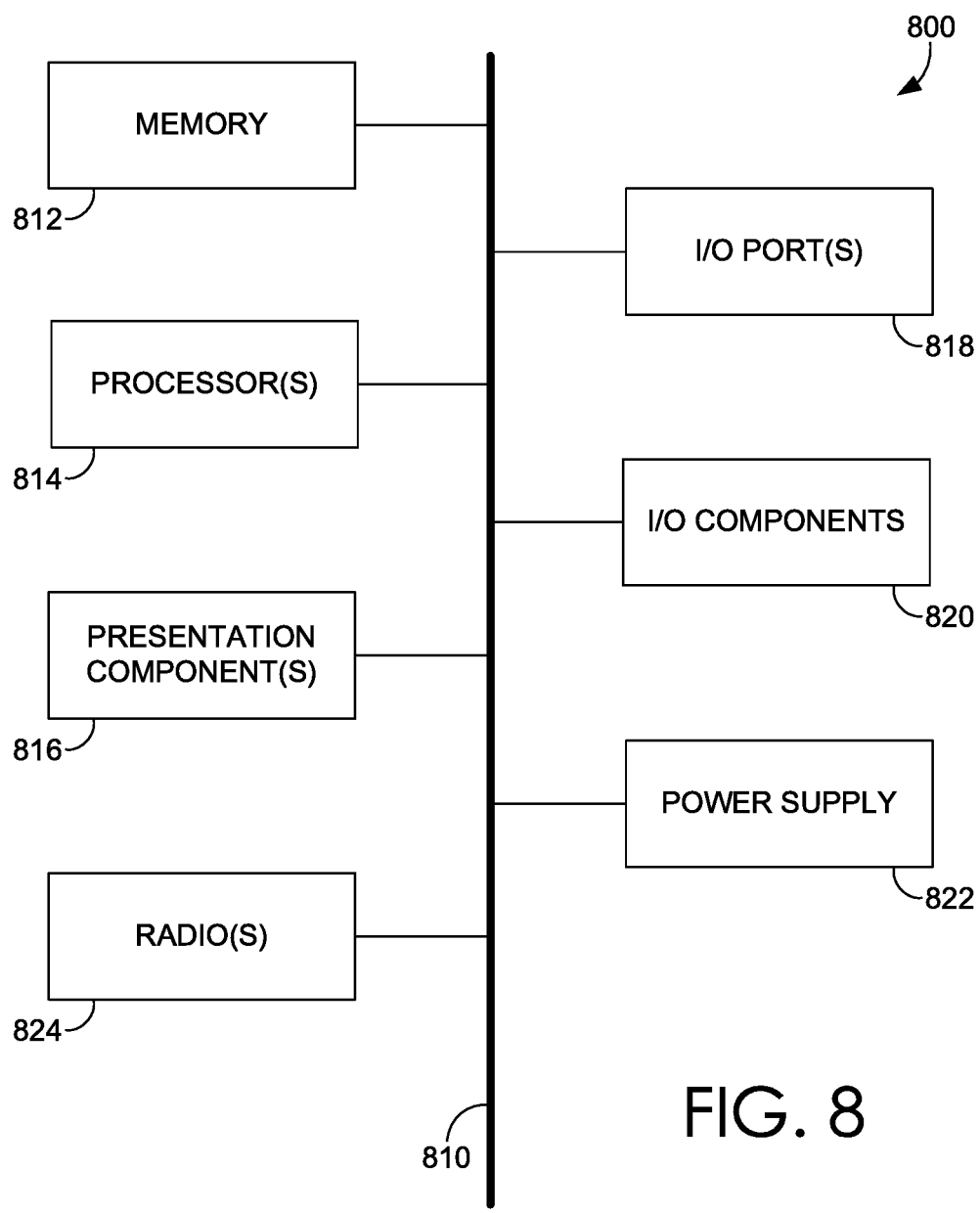
FIG. 8 is a block diagram of an exemplary computing environment suitable for use in implementations of the present disclosure.

FIG. 8 is a block diagram of an exemplary computing environment suitable for use in implementations of the present disclosure. FIG. 8 shows computing device 800, which can at least partially perform the various methods described herein. For example, the aforementioned video editing software can at least partially perform the various methods described herein and may be stored in memory 812. It is contemplated that the video editing software can be cloud based or can be implemented on a local device of the user.

With reference to FIG. 8, computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 8 is merely illustrative of an exemplary computing device that can be used in connection with one or more embodiments of the present invention. Distinction is not made between such categories as "workstation," "server," "laptop," "handheld device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 812 includes computer-storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as stereoscopic camera systems, infrared camera systems, RGB camera systems, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

As can be understood, implementations of the present disclosure provide for editing nested video sequences and animations of graphical objects. The present invention has been described in relation to particular embodiments, which are intended in all respects to be illustrative rather than restrictive. Alternative embodiments will become apparent to those of ordinary skill in the art to which the present invention pertains without departing from its scope.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computer-implemented method for video editing, the method comprising:
    based at least in part on a request to edit a parent video sequence, loading a timeline and monitor view of the parent video sequence within a graphical user interface (GUI), the parent video sequence including a lower layer that corresponds to a nested video sequence and one or more higher layers above the lower layer, the timeline of the GUI including representations of each of the lower layer and the one or more higher layers of the parent video sequence;
    receiving a first input indicative of a selection, within the timeline of the GUI, of a first graphical element that corresponds to a representation of the lower layer of the parent video sequence;
    based at least in part on the selection, rendering at least a graphical object from the nested video sequence in the monitor view of the GUI while disabling each of the one or more higher layers of the parent video sequence from being rendered in the monitor view of the GUI;
    receiving, while each of the one or more higher layers are disabled from being rendered in the monitor view by the disabling, a second input indicative of a manipulation of a second graphical element that corresponds to the graphical object from the nested video sequence; and
    applying, to the parent video sequence, the manipulation of the second graphical element to the graphical object from the nested video sequence.

2. The computer-implemented method of claim 1, further comprising, in response to the selection, enabling the manipulation of the second graphical element in the monitor view.

3. The computer-implemented method of claim 1, wherein the parent video sequence further comprises at least one additional layer below the lower layer, and wherein the rendering comprises graphical objects from each of the at least one additional layers of the parent video sequence.

4. The computer-implemented method of claim 1, further comprising, in response to the selection, restricting editing of any graphical objects outside of the nested video sequence from within the monitor view.

5. The computer-implemented method of claim 1, wherein the disabling from being rendered in the monitor view further comprises disabling from being rendered in the monitor view each visual effect applied over the nested video sequence in the parent video sequence, and the rendering is while each visual effect is disabled from being rendered in the monitor view by the disabling.

6. The computer-implemented method of claim 1, further comprising:
    receiving, in the GUI, a third input representative of a deselection of the first graphical element or another graphical element corresponding to the representation of the lower layer;
    based at least in part on the deselection, enabling to be rendered in the monitor view each of the one or more higher layers of the parent video sequence than the lower layer; and
    rendering an image of the parent video sequence in the monitor view while of the one or more higher layers is enabled to be rendered in the monitor view by the enabling.

7. The computer-implemented method of claim 1, further comprising:
    receiving, in the GUI, a third input indicative of a deselection of the first graphical element or another graphical element corresponding to the representation of the lower layer;
    based at least in part on the deselection, enabling each visual effect applied over the nested video sequence in the parent video sequence to be rendered in the monitor view; and
    rendering an image of the parent video sequence in the monitor view while each visual effect is enabled to be rendered in the monitor view by the enabling.

8. The computer-implemented method of claim 1, wherein the applying of the manipulation comprises mapping the manipulation from a coordinate space of the parent video sequence to a coordinate space of the nested video sequence, and modifying the graphical object from the nested video sequence based on the mapped manipulation.

9. The computer-implemented method of claim 1, further comprising:
    generating a modified parameter of the second graphical element based on the manipulation of the second graphical element, the modified parameter being generated based on a coordinate space of the nested video sequence;
    mapping the modified parameter of the second graphical element from the coordinate space of the nested video sequence to a coordinate space of the parent video sequence; and
    updating display of the second graphical element in the monitor view to reflect the mapped modified parameter.

10. The computer-implemented method of claim 1, wherein the first input includes an interaction with the first graphical element in the timeline.

11. One or more computer-readable storage media having a plurality of executable instructions embodied thereon, which, when executed by one or more processors, cause the one or more processors to perform operations comprising:
    based at least in part on a request to edit a parent video sequence, loading a timeline and monitor view of the parent video sequence within a graphical user interface (GUI);
    receiving a selection, within the timeline of the GUI, of a first graphical element corresponding to a video clip from a track of the parent video sequence, the track corresponding to a nested video sequence occupying a layer of the parent video sequence below one or more higher layers corresponding to higher tracks of the parent video sequence;

based at least in part on the selection, rendering at least a graphical object from the nested video sequence in the monitor view while disabling rendering of each of the one or more higher layers corresponding to the higher tracks of the parent video sequence in the monitor view;

receiving, while the rendering of each of the one or more higher layers corresponding to the higher tracks of the parent video sequence is disabled, a manipulation of a second graphical element that corresponds to the graphical object from the nested video sequence; and based at least in part on the manipulation, and while the rendering of each of the one or more higher layers corresponding to the higher tracks of the parent video sequence is disabled in the monitor view, updating the rendering of at least the graphical object from the nested video sequence in the monitor view an application of the manipulation to the second graphical element that corresponds to the graphical object from the nested video sequence.

12. The one or more computer-readable storage media of claim 11, further comprising, based at least in part on the selection, enabling the manipulation of the second graphical element in the monitor view.

13. The one or more computer-readable storage media of claim 11, wherein the track occupies a layer above one or more lower layers corresponding to one or more lower tracks of the parent video sequence, and wherein the rendering of at least the graphical object from the nested video sequence includes graphical objects from each of the one or more lower layers of the parent video sequence.

14. The one or more computer-readable storage media of claim 11, wherein the graphical object is rendered to correspond to a frame of an animation of the graphical object from the nested video sequence, the manipulation corresponds to movement of the graphical object in each frame of the animation, and the operations further comprise restricting the manipulation from resulting in the graphical object being at least partially outside of the monitor view for each frame of the animation during the rendering.

15. The one or more computer-readable storage media of claim 11, wherein the graphical object is rendered to correspond to a frame of an animation of the graphical object from the nested video sequence, the manipulation corresponding to a resize of the graphical object in each frame of the animation, and the operations further comprise restricting the manipulation from resulting in the graphical object being at least partially outside of the monitor view for each frame of the animation during the rendering.

16. A computer-implemented system comprising:
one or more processors and memory, coupled with the one or more processors, having executable instructions embodied thereon, which, when executed by the one or more processors cause the one or more processors to perform operations for video editing, the operations comprising:

based at least in part on a request to edit a parent video sequence, loading a timeline and monitor view of the parent video sequence within a graphical user interface (GUI);

receiving a selection, within the timeline of the GUI, of a first graphical element corresponding to a video clip from a track of the parent video sequence, the track corresponding to a nested video sequence occupying a layer of the parent video sequence below one or more higher layers corresponding to higher tracks of the parent video sequence;

based at least in part on the selection, rendering at least a graphical object from the nested video sequence in the monitor view while disabling rendering of each of the one or more higher layers corresponding to the higher tracks of the parent video sequence in the monitor view;

receiving, while the rendering of each of the one or more higher layers corresponding to the higher tracks of the parent video sequence is disabled, a manipulation of a second graphical element that corresponds to the graphical object from the nested video sequence; and based at least in part on the manipulation, and while the rendering of each of the one or more higher layers corresponding to the higher tracks of the parent video sequence is disabled in the monitor view, updating the rendering of at least the graphical object from the nested video sequence in the monitor view to reflect an application of the manipulation to the second graphical element that corresponds to the graphical object from the nested video sequence.

17. The computer-implemented system of claim 16, wherein the operations further comprise, based at least in part on the selection, enabling the manipulation of the second graphical element in the monitor view.

18. The computer-implemented system of claim 16, wherein the track occupies a layer above one or more lower layers corresponding to one or more lower tracks of the parent video sequence, and wherein the rendering of at least the graphical object from the nested video sequence includes graphical objects from each of the one or more lower layers of the parent video sequence.

19. The computer-implemented system of claim 16, wherein the rendering of at least the graphical object is while excluding each visual effect applied over the video clip in the parent video sequence from the rendering.

20. The computer-implemented system of claim 16, wherein the operations further comprise:
receiving a deselection, in the GUI, of the first graphical element or another graphical element corresponding to the video clip;

based at least in part on the deselection, rendering an image of the parent video sequence in the monitor view while including each of the one or more higher layers of the parent video sequence.

* * * * *